United States Patent [19]

Duda

[11] Patent Number: 4,489,494
[45] Date of Patent: Dec. 25, 1984

[54] TAPE LOCKING DEVICE

[75] Inventor: Werner Duda, W. Sayville, N.Y.

[73] Assignee: Irwin Measuring Tool Company, Patchogue, N.Y.

[21] Appl. No.: 344,199

[22] Filed: Jan. 29, 1982

[51] Int. Cl.³ .............................................. G01B 3/10
[52] U.S. Cl. ..................................... 33/138; 242/84.8
[58] Field of Search ............... 33/138; 242/84.8, 107.2

[56] References Cited

U.S. PATENT DOCUMENTS

| | | | |
|---|---|---|---|
| 3,435,529 | 4/1969 | Quenot | 33/138 |
| 3,450,367 | 6/1969 | Edgell | 33/138 |
| 3,812,588 | 5/1974 | Bennett | 33/138 |
| 3,816,925 | 6/1974 | Hogan et al. | 242/84.8 |
| 4,293,058 | 10/1981 | Burton | 33/138 |

FOREIGN PATENT DOCUMENTS

| | | | |
|---|---|---|---|
| 1019094 | 11/1957 | Fed. Rep. of Germany | 33/138 |
| 21034 | 7/1970 | Japan | 33/138 |

*Primary Examiner*—Richard R. Stearns
*Attorney, Agent, or Firm*—Pasquale A. Razzano

[57] ABSTRACT

A retractable tape measure having a casing which contains a coiled tape rule whose free end extends through an opening in the casing and includes means for locking the tape against automatic retraction into the casing. The lock means consists of a locking member mounted in the casing for pivotal movement in a plane generally transverse to the direction of retraction of the tape, with a free end located to engage the tape and hold it against a portion of the casing in a first pivoted position of the lock member and to be spaced from the tape in a second pivoted position. A slide actuator operatively engaged through a cam arrangement is provided for pivoting the lock member between its first and second positions.

9 Claims, 4 Drawing Figures

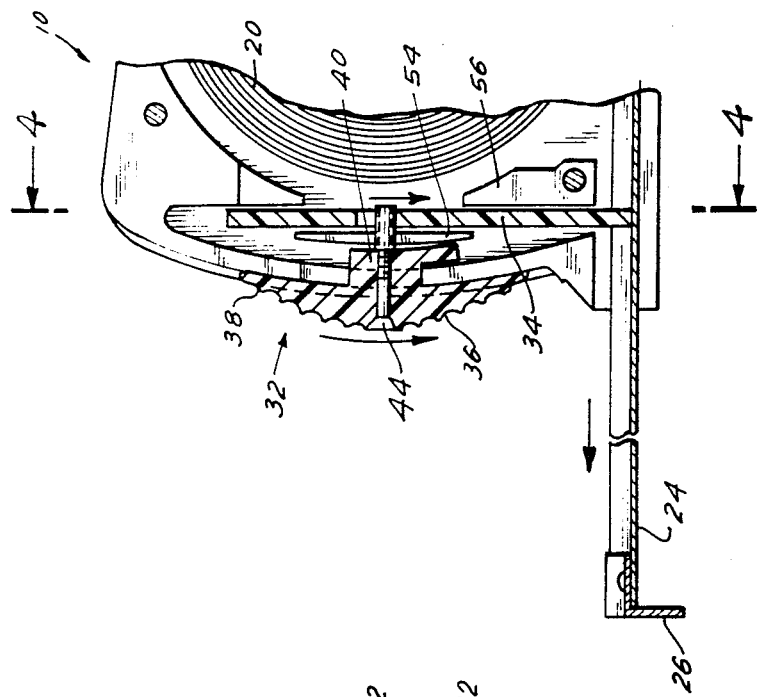
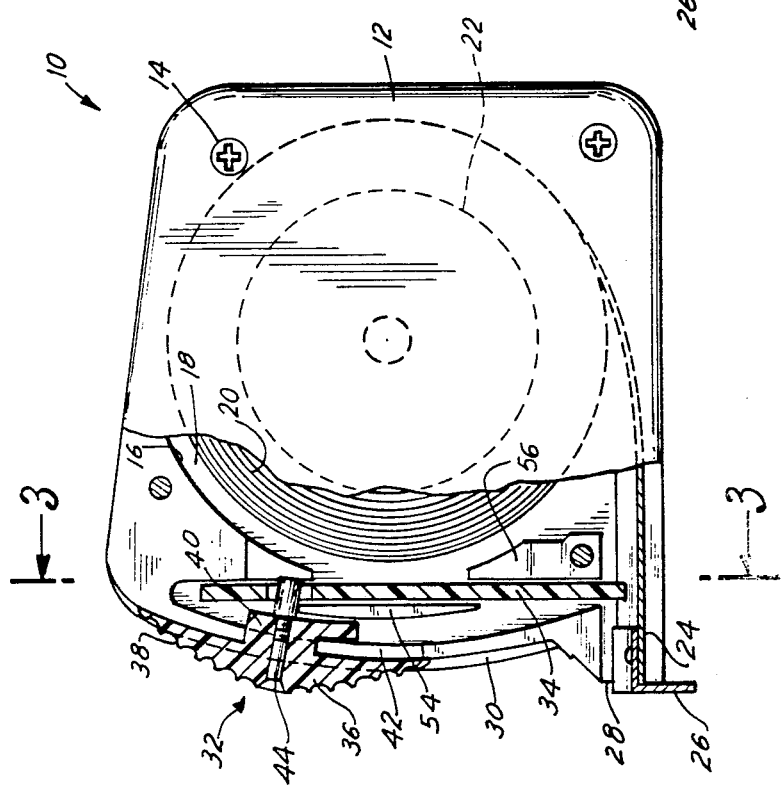

TAPE LOCKING DEVICE

The present inventions relate to tape rules and, more particularly, to a locking arrangement for preventing automatic retraction of the tape rule into its casing.

Retractable tape rules are a well known and highly useful tool in the carpentry and other trades. Such products have been constructed in the past which permit automatic retraction of the tape rule into a casing, under the influence of a spring powered retraction unit. In the past, a variety of different types of lock members have been proposed for automatic tape rules to lock the tape in a selected extended position and hold in against retraction under the influence of the spring retraction unit or motor. Such previously proposed locking devices have been relatively complex in construction and subject to excessive wear. In addition, the positive nature of the lock provided has not always been reliable.

It is an object of the present invention to provide a locking arrangement for an automatically retractable tape rule, which is relatively simple in construction and durable in operation.

Another object of the present invention is to provide a locking arrangement for an automatically retractable tape rule which is easily assembled.

Yet another object of the present invention is to provide a locking arrangement for an automatically retractable tape rule which is simple and reliable in operation.

In accordance with an aspect of the present invention a tape rule having a casing including an opening therein through which an extended tape rule may pass, includes a spring motor or the like for automatically retracting the tape rule into the casing in a coil. The tape rule is selectively locked in any desired extended position by a lock member which is pivotally mounted in the casing for movement between first and second positions. The lock member has a free end located to engage the tape rule against a portion of the casing in the first position thereby to lock the rule against retraction, and a second position spaced from the rule to permit unimpeded retraction thereof. A slide actuator on the front face of the casing is operatively engaged with the lock member, through a pin and cam slot arrangement, for pivoting the lock member between its first and second positions.

The above and other objects, features and advantages of this invention will be apparent in the following detailed description of an illustrative embodiment thereof, which is to be read in connection with the accompanying drawings, wherein:

FIG. 1 is a side elevational view, with parts broken away, of a tape rule constructed in accordance with the present invention;

FIG. 2 is a partial side elevational view similar to FIG. 1 showing the tape extended and the locking member in its first or locking position;

Figure 4:
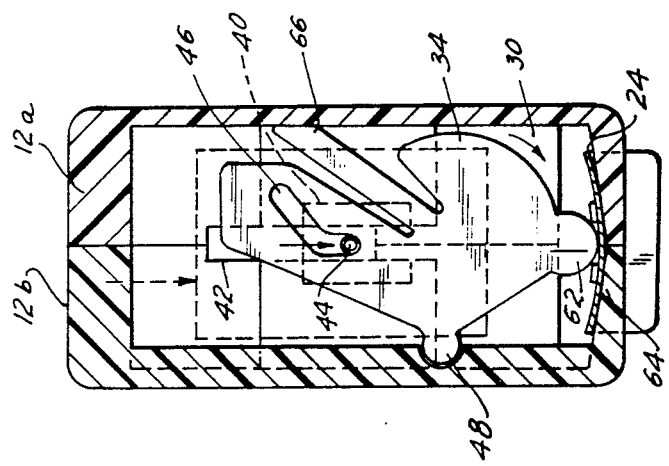
FIG. 4 is a sectional view similar to FIG. 3 showing the locking member in its first or locking position.

Referring now to the drawing in detail, and initially to FIG. 1 thereof, a tape rule 10, constructed in accordance with the present invention is illustrated. The rule includes a casing 12 which may be formed of molded plastic, in two halves 12a, 12b of substantially identical construction. The casing halves are secured together by screws 14 or the like in any known manner. The casing includes interior guide walls 16 which define a well or recess 18 in the casing that receives the coiled tape rule 20. The latter has one end connected to a spring powered motor 22 or the like of conventional construction, well known in the art for automatically retracting the tape into the casing. The tape rule has a free end 24 including a pull member 26 or the like, which extends through an opening or slot 28 formed in the front wall 30 of the casing.

The locking arrangement 32 of the present invention is mounted adjacent the front wall 30 of the casing and includes a lock member 34 and a slide actuator member 36. The latter has a knurled outer surface 38, and an inwardly extending abutment or tongue 40, which passes through a slot 42 formed on front wall 30 of the casing. Tongue 40 includes interior flanges 42 located adjacent the back sides of front wall 30 along slot 42 to hold the actuator in the slot, while permitting the actuator to slide therein.

A cam pin 44 or the like is mounted in any convenient manner in actuator 36 and extends into a slot 46 formed in lock member 34.

Figure 3:
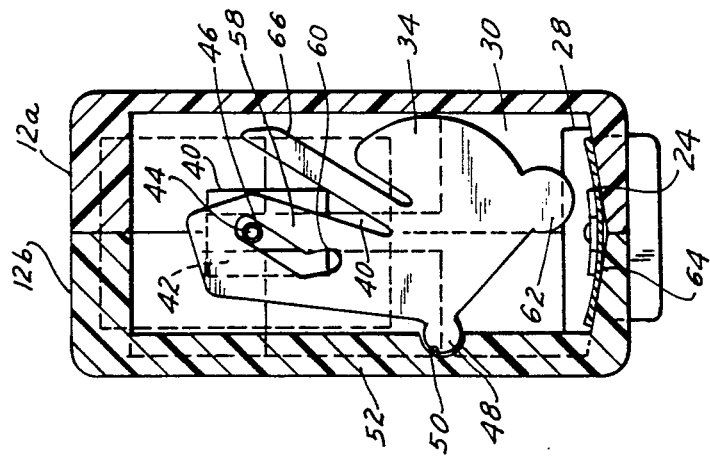
FIG. 3 is a sectional view taken along line 3—3 of FIG. 1, showing the locking member in its second or unlocking position.

Lock member 34 has a multisided configuration, as illustrated in FIGS. 3 and 4. It includes a first protuberance 48 having a curved surface which is received in a complimentary curved pocket 50 on one side wall 52 of the casing half 12b. This protuberance 48 permits lock member 34 to pivot, between the positions shown in FIGS. 3 and 4. The lock member itself is held in a single plane using this pivotal movement by the auxiliary guide walls 54, 56 formed in casing halves 12a and 12b, as seen in FIGS. 1 and 2.

Slot 46 is formed in the upper end of the lock member, as seen in FIGS. 3 and 4 and has a first leg 58 formed at an angle to its second leg 60.

In the second or unlocked position of lock member 34 shown in FIG. 3, pin 44 is received at the upper end of slot leg 58 and holds lock member 34 in its second or unlocking position. When actuator 36 is moved downwardly from the position shown in FIG. 1 to the position shown in FIG. 2, as for example by movement of the operator's thumb, pin 44 moves downwardly in slot leg 58 and cams lock member 34 into its first or locking position, as shown in FIG. 4. In this position pin 44 enters slot leg 60 and holds lock member 34 in this locked position. By having pin 44 enter the straight and now vertical leg 60 of slot 46 the lock member is held and locked in position by the actuator against inadvertent return of the lock member to its unlocked position. In this locked position, the rounded lower end 62 of lock member 34 is urged tightly against tape 24 and is held against the base wall 64 of the casing, thereby locking the tape against automatic retraction.

In accordance with a feature of the present invention, lock member 34 includes a tongue or leaf spring member 66 integrally formed therewith. As the lock member is formed of a plastic material, tongue 66 is resilient. The tongue is dimensioned, as seen in FIGS. 3 and 4, relative to the dimensions of the casing so that in the second or unlocked position of member 34, the tongue is spaced from the casing side wall. However, in the locked position shown in FIG. 4, tongue 66 engages the side wall of the casing half 12a. This engagement causes a slight bending of the tongue, and thereby creates the application of a biasing force urging lock member 34 from the position shown in FIG. 4 toward the position shown in FIG. 3. However, since the lock member is held against movement in that direction by the positioning of pin 44 in slot leg 60 the lock member does not move. But, as soon as actuator member 36 is moved upwardly by the operator, pin 44 moves out of leg 60 and tongue 66 operates to urge the lock member in a counterclockwise direction, as viewed in FIG. 4, to immediately disengage the lock member from the tape rule, permitting automatic retraction thereof even as the actuator member 38 continues to be moved upwardly to complete pivotal movement of the lock member to the second position thereof shown in FIG. 3.

Accordingly, it will be seen that a relatively simply constructed tape rule device is provided which functions to positively lock the tape in its extended position against automatic retraction. In addition, the structure is relatively simple and economic to manufacture, and easy to assemble.

Although an illustrative embodiment of the present invention has been described herein with reference to the accompanying drawing, it is to be understood that the invention is not limited to that precise embodiment and that various changes and modifications may be effected therein by one skilled in the art without departing from the scope or spirit of this invention.

I claim:

1. In a retractable tape measure including a casing having front and sidewalls and a coiled tape rule therein including a free end extending through an opening in said front wall and means for retracting the tape, the improvement comprising means for locking the tape against automatic retraction in an extended position including a lock member having a free end and an opposed mounting end mounted in one of the sidewalls of said casing to permit arcuate pivotal movement of the locking member in a plane generally transverse to the direction of retraction of the tape and to said sidewalls, said free end being located to engage said tape and hold it against a portion of the casing in a first pivoted position of the lock member and to be spaced from the tape in a second pivoted position of the lock member, and means for pivoting said lock member between said first and said second pivoted positions.

2. In a retractable tape measure including a casing having a coiled tape rule therein including a free end extending through an opening in the casing and means for retracting the tape, the improvement comprising means for locking the tape against automatic retraction means for locking the tape against automatic retraction in an extended position including a lock member mounted in said casing for pivotal movement in a plane generally transverse to the direction of retraction of the tape and having a free end located to engage said tape and hold it against a portion of the casing in a first pivoted position of the lock member and to be spaced from the tape in a second pivoted position of the lock member, and means for pivoting said lock member between said first and said second pivoted positions; said pivoting means includes an actuating member slidably mounted on said casing and cooperating cam means on said actuating member and said lock member for pivoting the lock member between said first and second positions.

3. In a rectractable tape measure as defined in claim 2 wherein said pivoting means includes spring means for urging said lock member from said first to said second positions.

4. In a retractable tape measure as defined in claim 3 wherein said spring means comprises an integral resilient finger formed on said lock member and positioned to engage a portion of said casing in the first position of the lock member to apply a biasing force to the lock member urging it towards said second position, said cam means holding said lock member in said first position against said biasing force until said actuating member is operated.

5. In a retractable tape measure as defined in claim 4 wherein said cooperating means includes a pin on said actuator member and a slot receiving said pin formed in said lock member; said slot having a predetermined configuration selected to move said lock member between said first and second positions and to hold the lock member in said first position against said biasing force.

6. A tape rule comprising a casing having a tape dispensing opening therein, a tape rule coiled in said casing and having a free end extending through said opening; means for retracting the tape through said opening and winding the tape into a coil; and means for selectively locking said tape in an extended position including a lock member pivotally mounted in said casing for movement between first and second positions, said lock member having a free end located to engage said tape rule against a portion of the casing in said first position to lock the tape rule against retraction; and a second position spaced from the rule to permit unimpeded retraction thereof; and means for pivoting said lock member between said first and second positions; said lock member being mounted to pivot transversely of the direction of movement of said tape through said casing opening; and said lock member having a rounded protuberance formed therein and said casing having a cooperating recess formed therein receiving said protuberance and providing the pivotal movement for the lock member.

7. A tape rule comprising a casing having a tape dispensing opening therein, a tape rule coiled in said casing and having a free end extending through said opening; means for retracting the tape through said opening and winding the tape into a coil; and means for selectively locking said tape in an extended position including a lock member pivotally mounted in said casing for movement between first and second positions, said lock member having a free end located to engage said tape rule against a portion of the casing in said first position to lock the tape rule against retraction; and a second position spaced from the rule to permit unimpeded retraction thereof; and means for pivoting said lock member between said first and second positions; said lock member being mounted to pivot transversely of the direction of movement of said tape through said casing opening; and said lock member having a rounded protuberance formed therein and said casing having a cooperating recess formed therein receiving said protuberance and providing the pivotal movement for the lock member; said pivoting means including an actuating member slidably mounted on said casing and cooperating cam means on said actuating member and said lock member for pivoting the lock member between said first and second positions; said pivoting means further including spring means for urging said lock member from said first to said second positions.

8. A tape rule as defined in claim 7 wherein wherein said spring means comprises an integral resilient finger formed on said lock member and positioned to engage a portion of said casing in the first position of the lock member to apply a biasing force to the lock member urging it towards said second position, said cam means holding said lock member in said first position against said biasing force until said actuating member is operated.

9. A tape rule as defined in claim 8 wherein said cooperating means includes a pin on said actuator member and a slot receiving said pin formed in said lock member; said slot having a predetermined configuration selected to move said lock member between said first and second positions and to hold the lock member in said first position against said biasing force.

* * * * *